United States Patent
Jeong et al.

(10) Patent No.: US 7,099,093 B2
(45) Date of Patent: Aug. 29, 2006

(54) COMPACT LENS MODULE

(75) Inventors: Dae Hyun Jeong, Kyungki-do (KR); Oui Serg Kim, Seoul (KR); Hyung Min Choi, Kyungki-do (KR); Yong Joo Jo, Kyungki-do (KR); Jung Ho Ryu, Kyungki-do (KR); Il Woo Seok, Kyungki-do (KR); Jung Kyun Cho, Seoul (KR); Byung Woo Kang, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 46 days.

(21) Appl. No.: 10/929,406

(22) Filed: Aug. 31, 2004

(65) Prior Publication Data

US 2005/0195502 A1 Sep. 8, 2005

(30) Foreign Application Priority Data

Mar. 4, 2004 (KR) ...................... 10-2004-0014769

(51) Int. Cl.
*G02B 7/02* (2006.01)
*G02B 15/14* (2006.01)
*H01L 41/04* (2006.01)

(52) U.S. Cl. ...................... 359/823; 359/824; 359/826; 359/694; 359/698; 359/704; 310/317; 348/345

(58) Field of Classification Search ................ 359/808, 359/826, 823, 824, 494, 699, 698; 324/207.21; 310/317, 323, 323.02; 348/65, 345, 208.11, 348/240.99; 396/55; 355/53, 56
See application file for complete search history.

(56) References Cited

U.S. PATENT DOCUMENTS

| 5,136,200 | A | * | 8/1992 | Takizawa et al. ...... 310/323.16 |
| 5,191,688 | A | * | 3/1993 | Takizawa et al. .......... 29/25.35 |
| 5,198,935 | A | | 3/1993 | Imanari et al. ............. 359/698 |
| 5,225,941 | A | * | 7/1993 | Saito et al. ................. 359/824 |
| 5,644,440 | A | * | 7/1997 | Akada ........................ 359/823 |
| 5,669,127 | A | * | 9/1997 | Takahashi et al. ......... 29/25.35 |
| 5,745,800 | A | * | 4/1998 | Kanbara et al. .............. 396/55 |
| 5,812,330 | A | * | 9/1998 | Akada ........................ 359/823 |
| 5,842,053 | A | * | 11/1998 | Ueyama et al. ............... 396/55 |
| 6,016,231 | A | * | 1/2000 | Kanbara et al. ............ 359/824 |
| 6,078,438 | A | * | 6/2000 | Shibata et al. .............. 359/819 |
| 6,134,057 | A | * | 10/2000 | Ueyama et al. ............. 359/821 |
| 6,215,605 | B1 | * | 4/2001 | Kuwana et al. ............. 359/824 |

(Continued)

FOREIGN PATENT DOCUMENTS

| DE | 197 34 118 | 5/1999 |
| JP | 4-212913 | 8/1992 |
| JP | 07-39177 | 2/1995 |
| JP | 2001-45777 | 2/2001 |

*Primary Examiner*—Loha Ben
(74) *Attorney, Agent, or Firm*—Lowe Hauptman Berner, LLP.

(57) ABSTRACT

Provided is a compact lens module which enables zoom and auto-focus functions even in a small lens module by providing a lens carrying structure using a supersonic driving unit. A lens unit is positioned in a case and has at least one lens. A carrying member is rotatably connected in the case and connected to the lens unit so that the lens unit may move forward and backward. In addition, a driving unit is mounted in the case for transferring a driving force to the carrying member so as to move the lens unit by repeatedly contacting and non-contacting with the carrying member.

26 Claims, 12 Drawing Sheets

U.S. PATENT DOCUMENTS

| | | | |
|---|---|---|---|
| 6,232,697 B1 * | 5/2001 | Mizumoto | 310/317 |
| 6,232,700 B1 * | 5/2001 | Kosaka et al. | 310/323.17 |
| 6,268,970 B1 | 7/2001 | Ito et al. | 359/826 |
| 6,392,827 B1 * | 5/2002 | Ueyama et al. | 359/824 |
| 6,483,226 B1 * | 11/2002 | Okada | 310/328 |
| 6,853,507 B1 * | 2/2005 | Ryu et al. | 359/824 |
| 6,947,091 B1 * | 9/2005 | Widmann et al. | 348/345 |
| 6,961,193 B1 * | 11/2005 | Kang et al. | 359/824 |

* cited by examiner

PRIOR ART

COMPACT LENS MODULE

This application claims the benefit of Korean Patent Application No. 2004-14769 filed on Mar. 4, 2004, in the Korean Intellectual Property Office, the disclosure of which is incorporated herein by reference.

BACKGROUND OF THE INVENITON

1. Field of the Invention

The present invention relates to a lens module, and more particularly, to a compact lens module which enables zoom and auto-focus functions even in a small lens module by providing a lens carrying structure using a supersonic driving unit.

2. Description of the Related Art

A camera technique is developed from a film camera using a film to a digital camera which converts an image into digital signals. Recently, such a digital camera is gradually miniaturized and begins to be applied to a personal mobile communication terminal. Quality of the digital camera mounted to the personal mobile communication terminal, for example a cellular phone, is based on the pixel number of the image sensor, which is increasing continually, and nowadays a digital camera having 1 million pixels or more is scheduled for marketing, or already in the market.

The compact camera mounted to the cellular phone is mainly used just for pleasure, but it is expected that the compact camera will be considered as a useful camera beyond its prior function as an amusement tool since an image of 1 million or more pixels is realized recently. Thus, desires for a zoom function and an auto focus function, which are generally adopted in the film camera, are also increased to the compact camera, which may make the compact camera be recognized as a formal camera.

As a semiconductor manufacturing process is applied to an image sensor, it is possible to accumulate more image sensors in a narrow area. However, for the optical zoom and auto-focusing functions, there is needed a lens module design having an especially short stroke and a compact driving unit.

Figure 1:
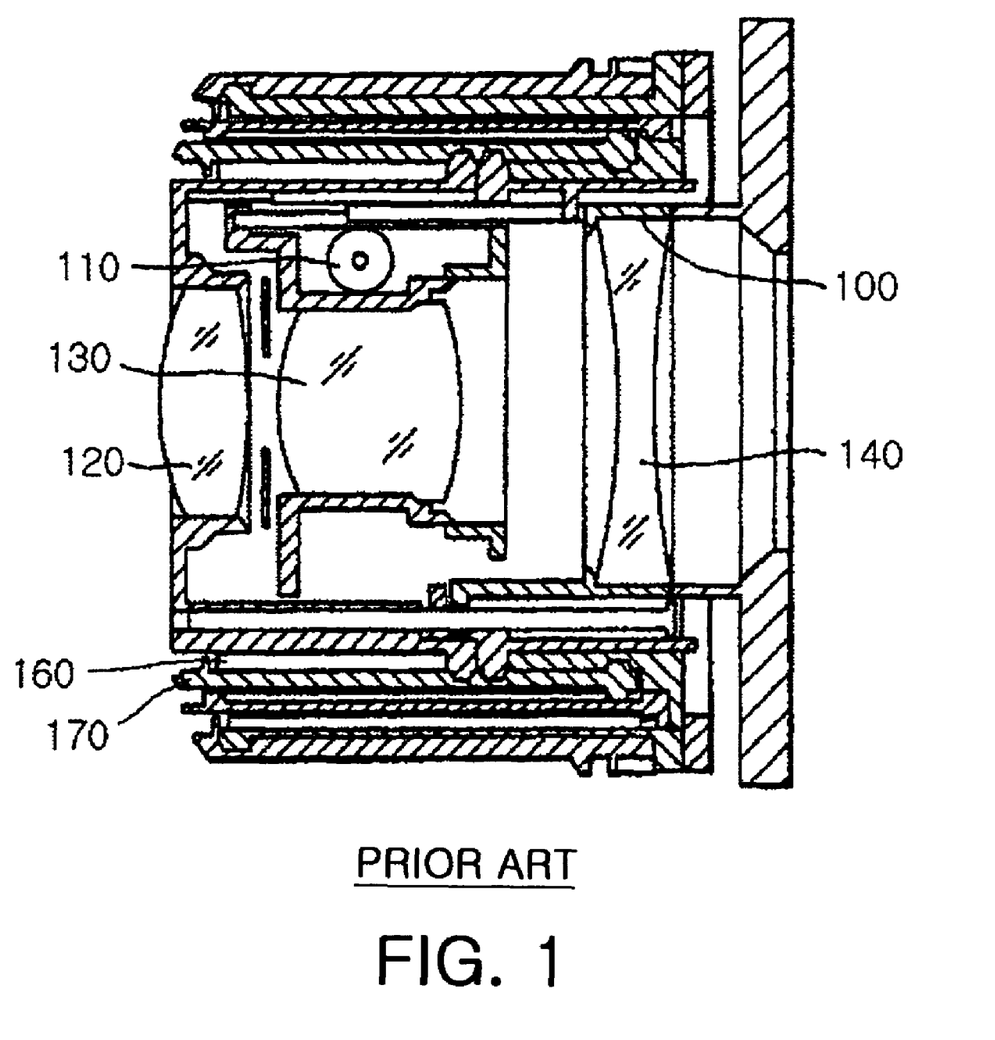
FIG. 1 a sectional view showing a conventional lens module.

FIG. 1 shows a conventional lens driving structure. FIG. 1 is disclosed in U.S. Pat. No. 6,268,970 in the title of "Zoom Lens Barrel". In FIG. 1, the barrel includes frames 100 for supporting each lens group 120, 130 and 140, and cam tubes 160 and 170 for supporting the frames. The cam tubes allow the frames to move the lens in an axial direction, and the cam tubes are driven by a driving actuator 110.

In the zoom driving method of such a cam structure, a relative position of each lens is determined according to the shape of the cam while the zoom function is used. Thus, a focusing lens and a driving unit are additionally required for focusing at a specific magnification, and the driving tool becomes disadvantageously complicated and large-sized since a final reduction gear and a lens holding structure moving along the cam are further required.

SUMMARY OF THE INVENTION

Accordingly, the present invention has been devised to solve the aforementioned problems, and an object of the present invention is to provide a lens module which may have a short lens moving stroke and a compact size by mounting a driving unit which operates with the use of supersonic frequency vibration.

Another object of the invention is to provide a lens module capable of operating accurately and having a compact size so that a small-size camera mounted to a small electronic machine may have a zoom function and an auto focus function.

In order to accomplish the above object, the present invention provides a lens module, which includes a case; a lens unit positioned in the case and having at least one lens; a carrying member rotatably connected in the case and connected to the lens unit such that the lens unit is movable forward and backward; and a driving unit mounted in the case for transferring a driving force to the carrying member so as to carry the lens unit by repeatedly contacting and non-contacting with the carrying member.

Preferably, the driving unit is a piezoelectric driving unit. At this time, the piezoelectric driving unit may include a hollow metal tube and piezoelectric plates attached to at least two sides of the metal tube.

Preferably, the metal tube is a solid metal rod.

More preferably, AC voltages with a phase difference are applied to the piezoelectric plate such that a bending displacement at a central portion of the metal tube in a length direction is converted into a rotational displacement. In addition, a thickness of the side of the metal tube to which the piezoelectric plate is attached is preferably smaller than a thickness of a side to which a piezoelectric plate is not attached. At this time, the metal tube may have a shape such as a circular pillar, a rectangular pillar and a triangular pillar.

Also preferably, the carrying member has a shaft shape to which a screw is partially formed, and the lens unit includes a lens housing for supporting the at least one lens. In addition, the screwed portion of the carrying member may be rotatably inserted to the lens housing so as to convert the driving force transferred from the driving unit into a carrying force in a straight direction and then transfer the carrying force to the lens unit.

At this time, the carrying member may include a contact wheel, which has a diameter greater than that of the shaft and is formed with the same center as the shaft so as to be contactable to the driving unit. In addition, at least one support member is preferably connected to the lens housing in parallel with the carrying member so as to guide the lens unit. Moreover, a central axis of the piezoelectric driving unit may be arranged in parallel with that of the carrying member.

Preferably, the piezoelectric driving unit is elastically supported by the case at portions adjacent to both ends thereof, and the contact wheel is positioned at a center of the portions where the piezoelectric driving unit is supported. At this time, the piezoelectric driving unit may be elastically supported by a leaf spring.

Preferably, the contact wheel and the piezoelectric driving unit are contacted through a frictional material, and the frictional material may be attached along a circumference of the contact wheel or to the piezoelectric driving unit.

In another aspect of the invention, there is also provided a lens module, which includes a case; a first lens unit positioned in the case and having at least one lens; a second lens unit spaced apart from the first lens unit at a rear position thereof and having at least one lens; at least one carrying member rotatably connected in the case, the first carrying member having a shaft shape to which a screw is partially formed, the screwed portion being connected to the first or second lens unit so as to move the first or second lens unit forward or backward; and at least one driving unit mounted in the case for transferring a driving force to the carrying unit so as to carry the first or second lens unit by repeatedly contacting and non-contacting with the carrying member.

Preferably, the driving unit is a piezoelectric driving unit including a hollow metal tube and piezoelectric plates attached to at least two sides of the metal tube, and the metal tube may be a solid metal rod. In addition, AC voltages with a phase difference may be applied to the piezoelectric plate such that a bending displacement at a central portion of the metal tube in a length direction is converted into a rotational displacement. Moreover, a thickness of the side of the metal tube to which the piezoelectric plate is attached is preferably smaller than a thickness of a side to which a piezoelectric plate is not attached, and the metal tube may have a shape selected from the group consisting of a circular pillar, a rectangular pillar and a triangular pillar.

In addition, the lens unit may include a lens housing for supporting the at least one lens, and the screwed portion of the carrying member may be rotatably inserted to the lens housing so as to convert the driving force transferred from the driving unit into a carrying force in a straight direction and then transfer the carrying force to the lens unit.

Preferably, the carrying member includes a contact wheel having a diameter greater than that of the shaft and formed with the same center as the shaft so as to be contactable to the driving unit. Also preferably, at least one support member is connected to the lens housing in parallel with the carrying member so as to guide the lens unit.

Also preferably, a central axis of the piezoelectric driving unit is arranged in parallel with that of the carrying member. At this time, the piezoelectric driving unit may be elastically supported by the case at portions adjacent to both ends thereof, and the contact wheel is preferably positioned at a center of the portions where the piezoelectric driving unit is supported. At this time, the piezoelectric driving unit may be elastically supported by a spring.

In addition, the contact wheel and the piezoelectric driving unit may be contacted through a frictional material. At this time, the frictional material may be attached along a circumference of the contact wheel or to the piezoelectric driving unit.

In still another aspect of the invention, there is also provided a lens module, which includes a first lens unit having at least one lens; a second lens unit spaced apart from the first lens unit at a rear position thereof and having at least one lens; a pair of carrying members having a shaft shape to which a screw is partially formed, a circular contact wheel being formed thereto in a direction perpendicular to an axial direction, the screwed portion being respectively connected to the first and second lens units so as to move the first and second lens units forward or backward; and a piezoelectric driving unit of a metal tube type which is supported at portions adjacent to both ends thereof, the piezoelectric driving unit transferring a driving force to the carrying unit so as to carry the first or second lens unit by repeatedly contacting and non-contacting with the carrying member.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, preferred embodiments of the present invention will be described in detail with reference to the accompanying drawings.

A zoom function of an optical instrument such as a camera is realized by means of arrangement and movement stroke of each lens unit. The zoom function is used to photograph an object at a distance far from the optical instrument such as a camera as if it is positioned closer. Using the zoom camera, a larger image may be obtained for the same object. Meanwhile, the zoom function may be generally classified into an optical zoom function and a digital zoom function. The optical zoom function is defined to realize the zoom function according to the change of distance between lenses, which may advantageously compensate an image sensor of low resolution without deteriorating the image quality. On the while, the digital zoom function may advantageously give an image having high exposure at a specific position though the image quality is deteriorated. The digital zoom function uses a software manner, for example, for amplifying image signals recognized in the image sensor.

In the general optical zoom mechanism, a focus lens and a zoom lens transfer an enlarged or reduced image to the image sensor with moving at the same interval or at different intervals.

In addition, a micro-focusing lens arranged together with the zoom lens is moved forward or backward to automatically focus according to a signal sent from a lens controller, independently from the movement of the zoom lens. In order to realize the auto focus function of the optical instrument, there is used a sound navigator, an infrared beam system, a contrast recognition system, a phase detection system, and the like.

The present invention provides a new structure capable of realizing the functions of the optical instrument in a smaller module rather than the prior art.

Figure 3:
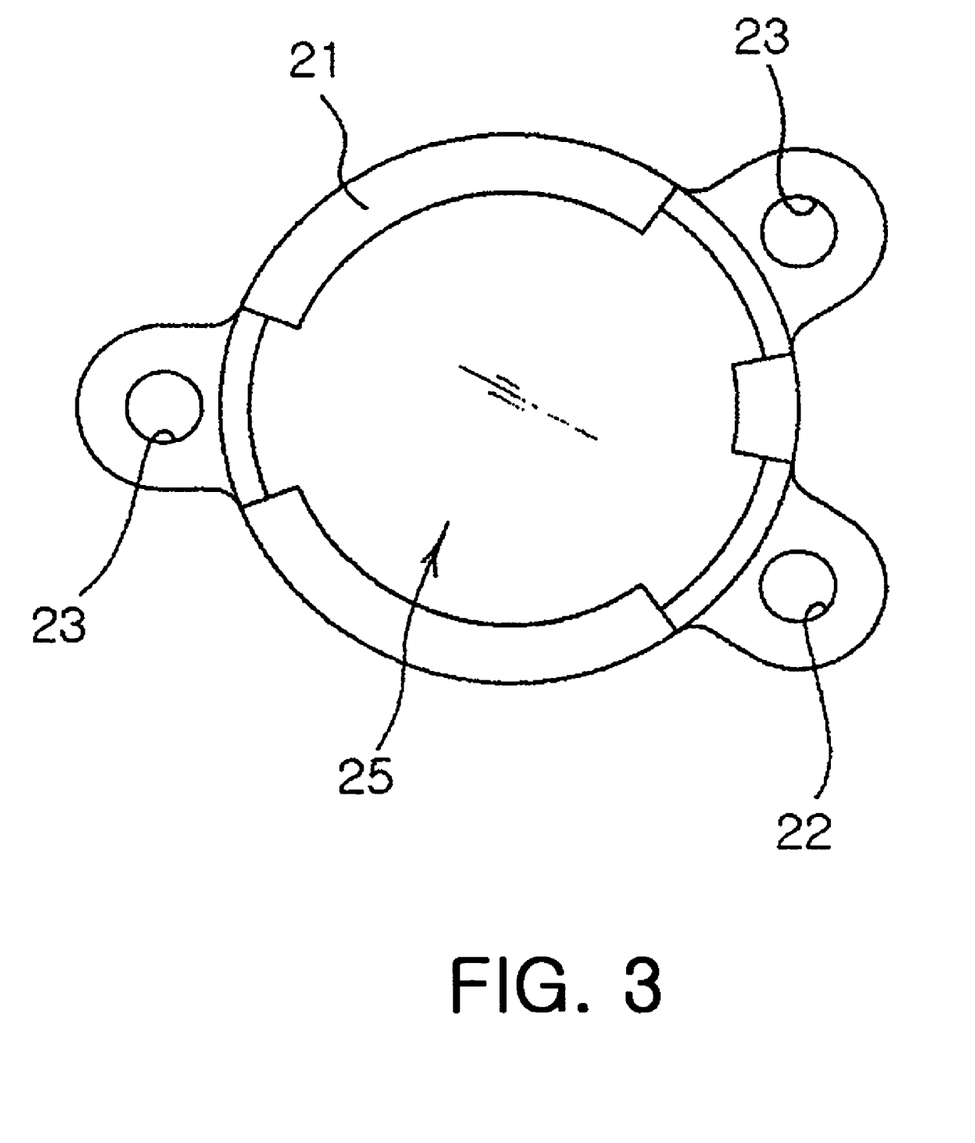
FIG. 3 is a plane view showing a lens housing of FIG. 2.

In the present invention, a conventional lens barrel used for moving a lens unit is excluded, and a small-sized driving structure is adopted instead. At first, the lens module of the present invention includes a lens unit 20 positioned in a case 11. The lens unit 20 has at least one lens 12. The lens 12 may be a convex lens or a concave lens, or their mixture. The lens 12 includes a lens housing 21 having a shape as shown in FIG. 3. The lens housing 21 has an opening 25 in which the lens 12 may be mounted. The lens 12 is mounted in the opening 25, and several lenses may also be mounted therein. The lens housing is preferably made of a light material such as a resin for the purpose of a small and light structure of the lens module. In addition, it is also possible to form a hole on the outer circumference of the lens 12 without using the lens housing.

Figure 6:
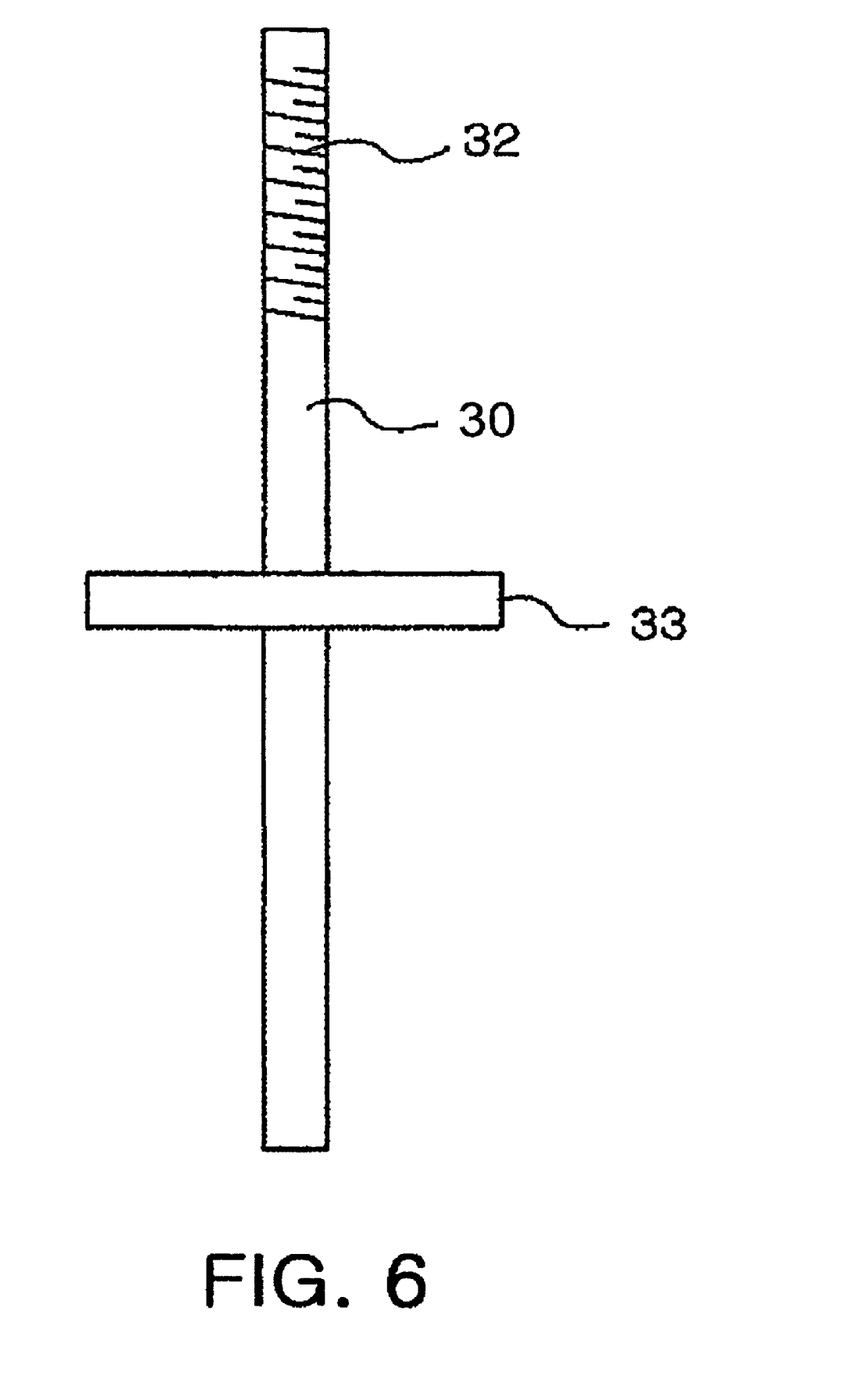
FIG. 6 is a sectional view showing a carrying member of FIG. 2.

The lens unit 20 is connected to a carrying member 30, and the carrying member 30 is rotatably mounted to the case 11. The carrying member 30 is connected to the lens unit 20 so that the lens unit may move forward or backward, and in this reason the carrying member 30 preferably has a shaft shape on which a screw is partially formed. The carrying member 30 has a shaft shape as shown in FIG. 6, and a screw of a predetermined slant is formed on a portion of the carrying member 30 which is connected to the lens unit 20. This enables the lens unit 20 to move vertically in FIG. 2 while the carrying member 30 rotates. At this time, the screw preferably has square threadS shape such that the rotation of the screw makes the lens unit move.

Preferably, the screw 32 of the carrying member is connected to the lens unit in a way that it is rotatably inserted into a hole 22 formed in the lens housing 21. In addition, it is also possible that the screw of the carrying member is directly connected to the lens.

At least one support member 15 is connected to the lens unit 20 in parallel with the carrying member 30 in order to guide the lens unit. The support member 15 is inserted into a hole 23 formed in the outer circumference of the lens housing of the lens unit 20, and mounted to be slidable on the lens housing. One end of the support member 15 is inserted into the lens housing, while the other end is fixed to the case 11. The support members 15 and the carrying members 30 are preferably arranged at an angle of 120 degrees on the basis of their center to support the lens unit. Accordingly, when the carrying member 30 rotates to move the lens unit 20 vertically, the lens unit may keep its horizontal state by means of the support members 15.

Meanwhile, the lens module of the present invention includes a driving unit 40 for transferring a driving force by repeatedly contacting and non-contacting with the carrying member 30. The driving unit 40 is mounted in the case 11 at a position adjacent to the carrying member 30. The driving unit 40 is preferably a piezoelectric driving unit. The piezoelectric driving unit is a driving means using a piezoelectric plate which may repeat bending transformation by applying voltage thereto. In the present invention, the driving unit and the carrying member 30 repeat contact and non-contact states by means of the piezoelectric bending displacement.

Figure 4:
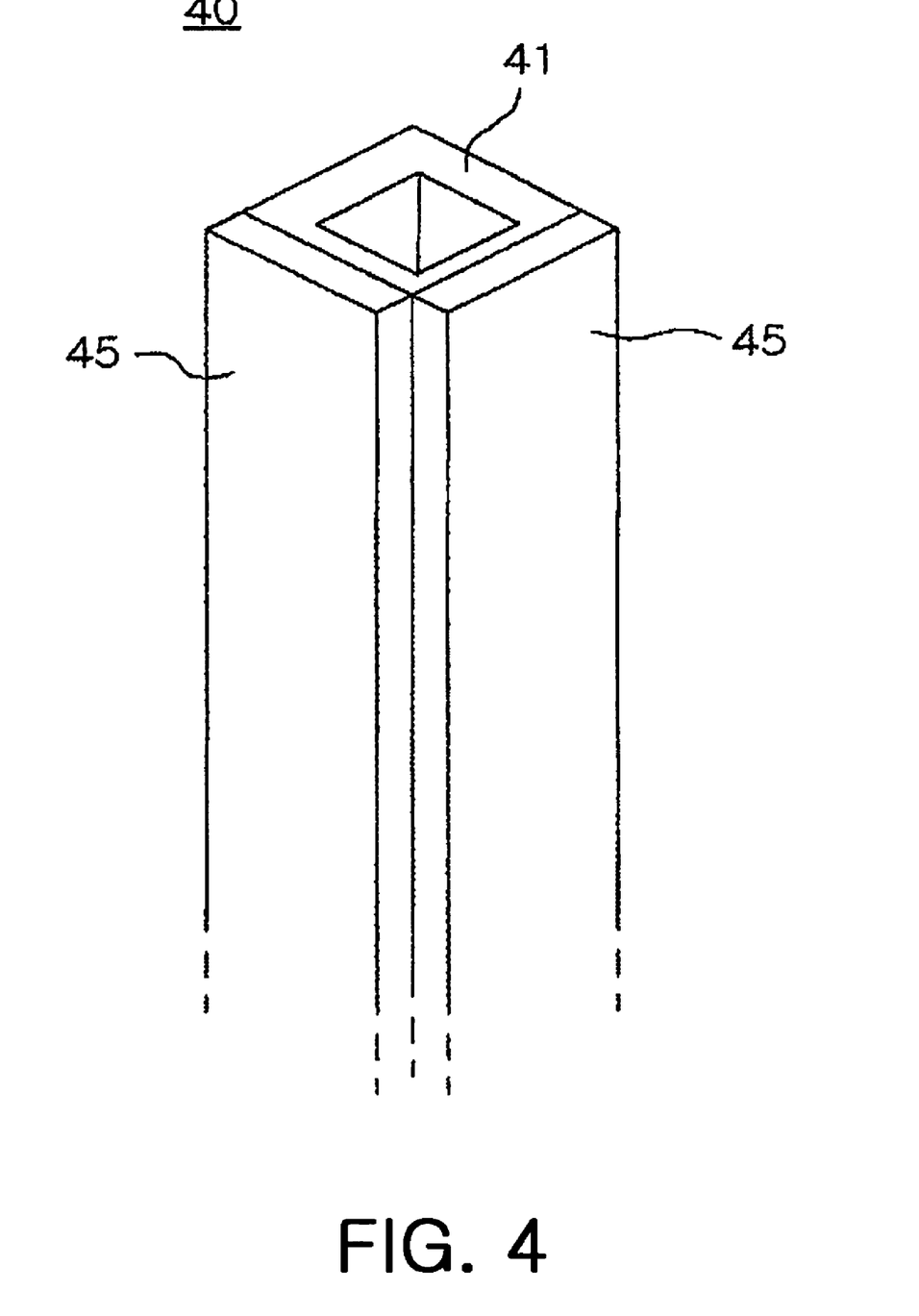
FIG. 4 is a perspective view showing an example of a piezoelectric driving unit shown in FIG. 2.

FIG. 4 shows an example of the piezoelectric driving unit 40 used in the present invention. In FIG. 4, the piezoelectric driving unit includes a hollow metal tube 41, and piezoelectric plates 45 attached to at least two sides of the metal tube. When an AC voltage is applied to the piezoelectric plate 45, the piezoelectric plate repeats bending transformation, which is resultantly transferred to the metal tube 41 to transform the metal tube.

Figure 9:
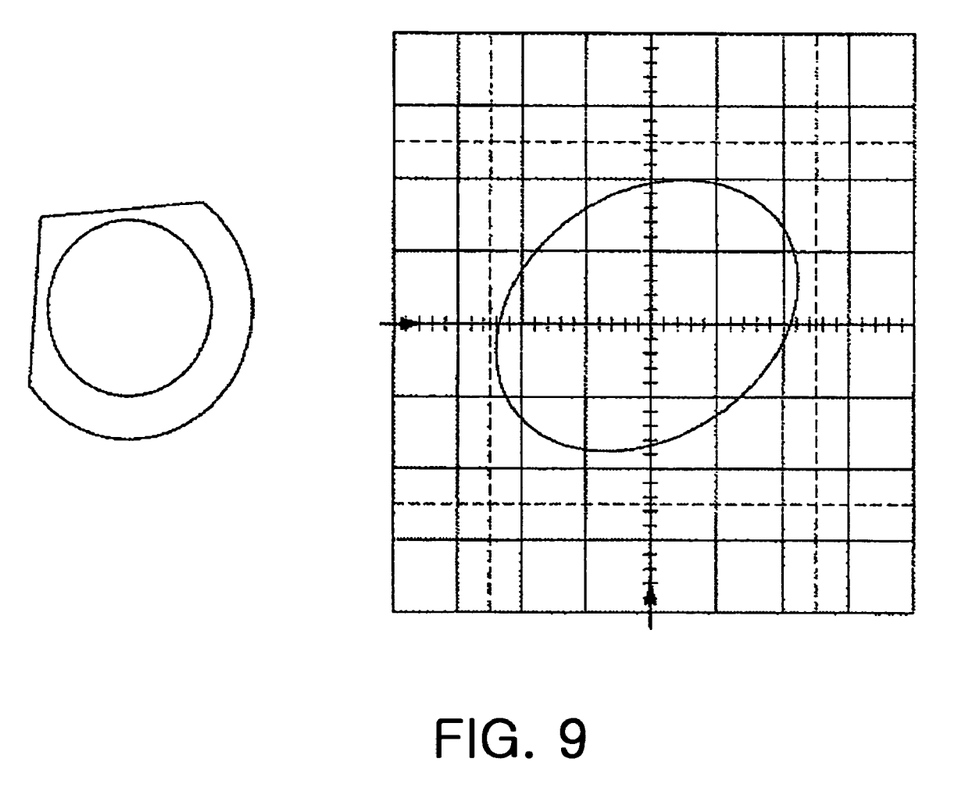
FIG. 9 shows a trajectory of the piezoelectric driving unit of the compact lens module according to the present invention.

If AC voltages with phase difference are applied to the piezoelectric driving unit while the piezoelectric plates 45 are attached to two adjacent sides of the metal tube, the bending displacement at a central portion of the metal tube 41 in a length direction is converted into a rotational displacement. That is to say, a bending transformation is generated in two piezoelectric plates 45 alternatively, thereby bending the metal tube alternatively. If this behavior is continuously conducted, a trajectory similar to circle is appeared as shown in FIG. 9. Though FIG. 9 shows the case that a circular hollow metal tube is used, a rectangular hollow metal tube shown in FIG. 4 also shows the same trajectory.

Figure 5:
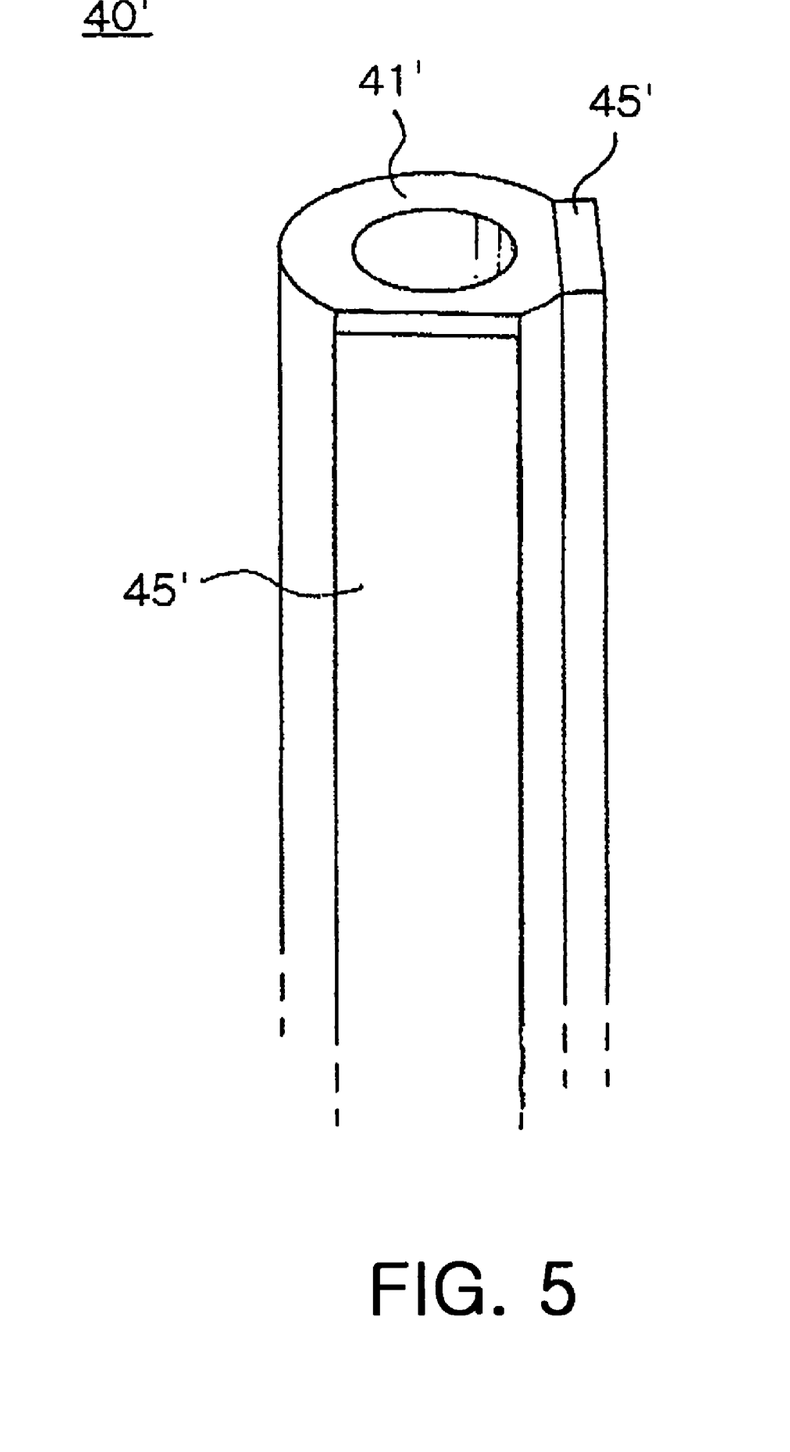
FIG. 5 is a perspective view showing another example of the piezoelectric driving unit shown in FIG. 2.

FIG. 5 shows another example 40' of the piezoelectric driving unit, which adopts a cylindrical hollow metal tube 41'. Piezoelectric plates 45' are attached on the outer circumference of the cylindrical metal tube 41' at about 90 degrees. The metal tube may have a rectangular or cylindrical shape, but the shape of the metal tube is not limited to those cases, and a triangular hollow metal tube may also be used as an example. In addition, the metal tube may also be a solid metal rod, different from the above examples.

In the metal tube 41 or 41' of FIG. 4 or 5, the side to which the piezoelectric plate 45 or 45' is attached preferably has a thickness smaller than that of a side to which a piezoelectric plate is not attached. This helps the bending displacement to be transferred from the piezoelectric plate to the metal tube more easily. For this purpose, in case of the cylindrical metal tube, a surface of the metal tube is partially cut away, and then the piezoelectric plates are attached thereto. On the while, in case of the rectangular metal tube, adjacent two sides are processed to a predetermined thickness, and then the piezoelectric plates are attached thereto.

Such a piezoelectric driving unit 40 is contacted with the carrying member 30. For better contact, the carrying member 30 includes a contact wheel 33 having a diameter capable of contacting with the driving unit. The contact wheel 33 has a diameter larger than a diameter of the shaft of the carrying member 30, and has the same center as the shaft of the carrying member.

Figure 7:
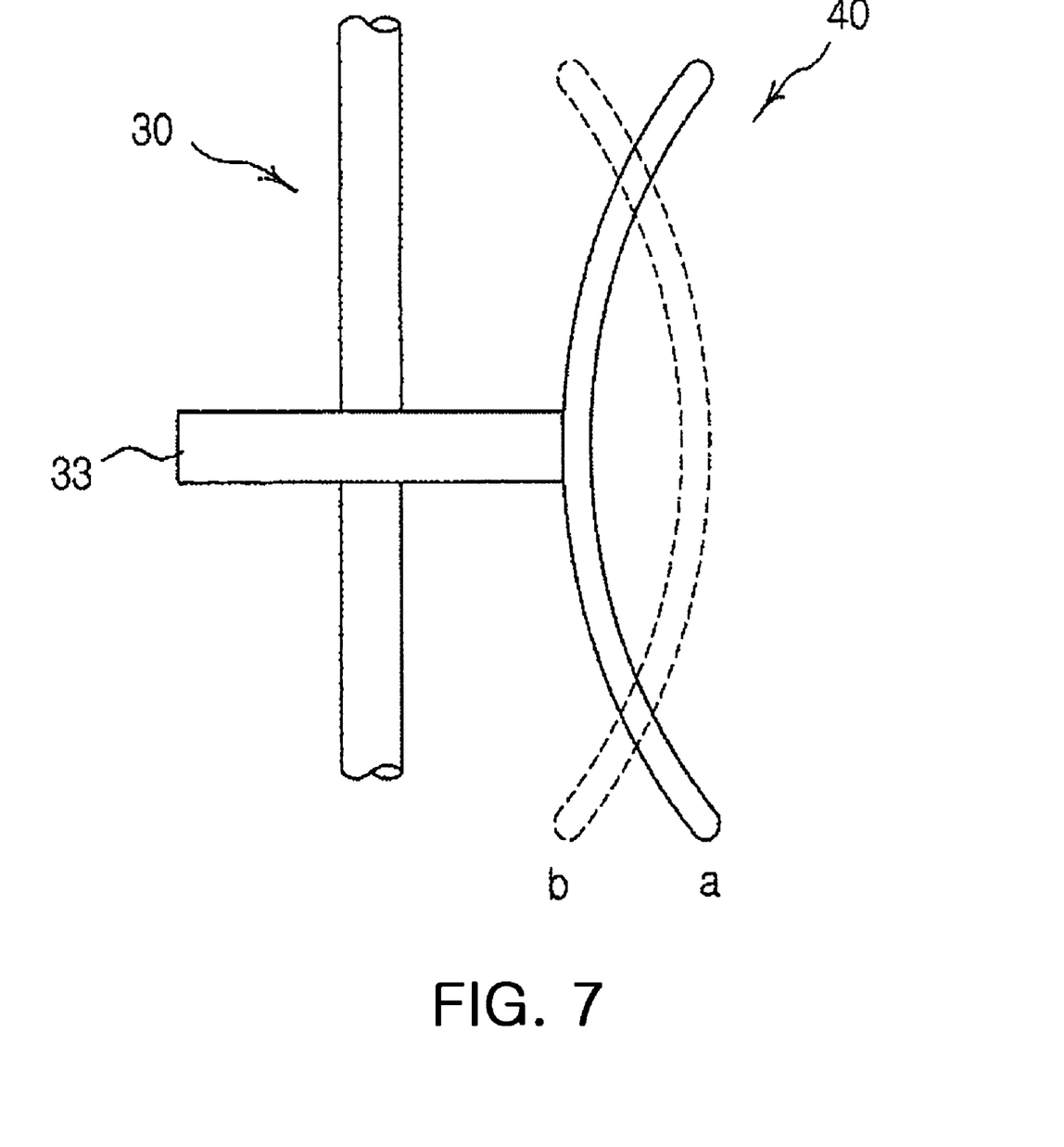
FIG. 7 is a schematic view for illustrating how a driving force is transferred from the driving unit to the carrying member of the compact lens module according to the present invention.

FIG. 7 shows a driving force transferring process between the piezoelectric driving unit 40 and the carrying member 30, configured as above. The driving unit 40 comes in contact with the contact wheel 33 of the carrying member 30 in the a state. After that, as the AC voltages with phase difference are continuously applied, the driving unit 40 is gradually transformed into the b state, and the carrying member 30 becomes rotated by means of a frictional force caused by the contact with the driving unit. This behavior is based on the principle of spinning a toy top by repeating contact and non-contact states with giving impacts thereto by a whip.

The contact/non-contact behavior of the piezoelectric driving unit 40 is repeated several ten thousand times to several hundred thousand times per second. Though this behavior gives a minute displacement to the carrying member, the carrying member may sufficiently rotate since the behavior is repeated fast. The piezoelectric driving unit 40 and the carrying member 30 are preferably arranged in parallel to each other for better transfer of the movement.

Meanwhile, the piezoelectric driving unit 40 is elastically supported by the case at positions adjacent to both ends thereof in order to transfer a driving force to the carrying member as shown in FIG. 7. That is to say, when a nodal point is set at both ends of the metal tube piezoelectric driving unit in a length direction, the maximum displacement is transferred at the center of the piezoelectric driving unit. In this reason, the portions adjacent to both ends of the piezoelectric driving unit are supported by means of a spring 17 fixed to a wall (not shown) of the case 11. At this time, though the spring 17 is depicted as a leaf spring, other kinds of springs such as a coil spring and a tension spring may also be used.

The reason of elastically supporting the piezoelectric driving unit is that the driving unit may exert sufficient frictional force when being contacted with the carrying member so that the carrying member may rotate smoothly.

That is to say, since the frictional force is proportional to a vertical force, a sufficient frictional force may be obtained by elastically pushing the driving unit toward the carrying member.

In addition, in order to obtain a sufficient frictional force, a frictional material 55 is arranged between the contact wheel 33 of the carrying member 30 and the metal tube 41 of the piezoelectric driving unit 40 as shown in FIG. 10. The frictional material 55 gives a sufficient frictional force and also solves some problems such as noise or abrasion caused by the contacted movement of the contact wheel 33 and the metal tube 41. The frictional material 55 is made of abrasion-resistant film or plate. In addition, the frictional film may be made of polymer resin such as thermosetting polyimide epoxy, Teflon polymer, ultraviolet-curing epoxy and so on, which has excellent adhesive strength, uniform surface, good hardness and low viscosity after curing.

Figure 10A:
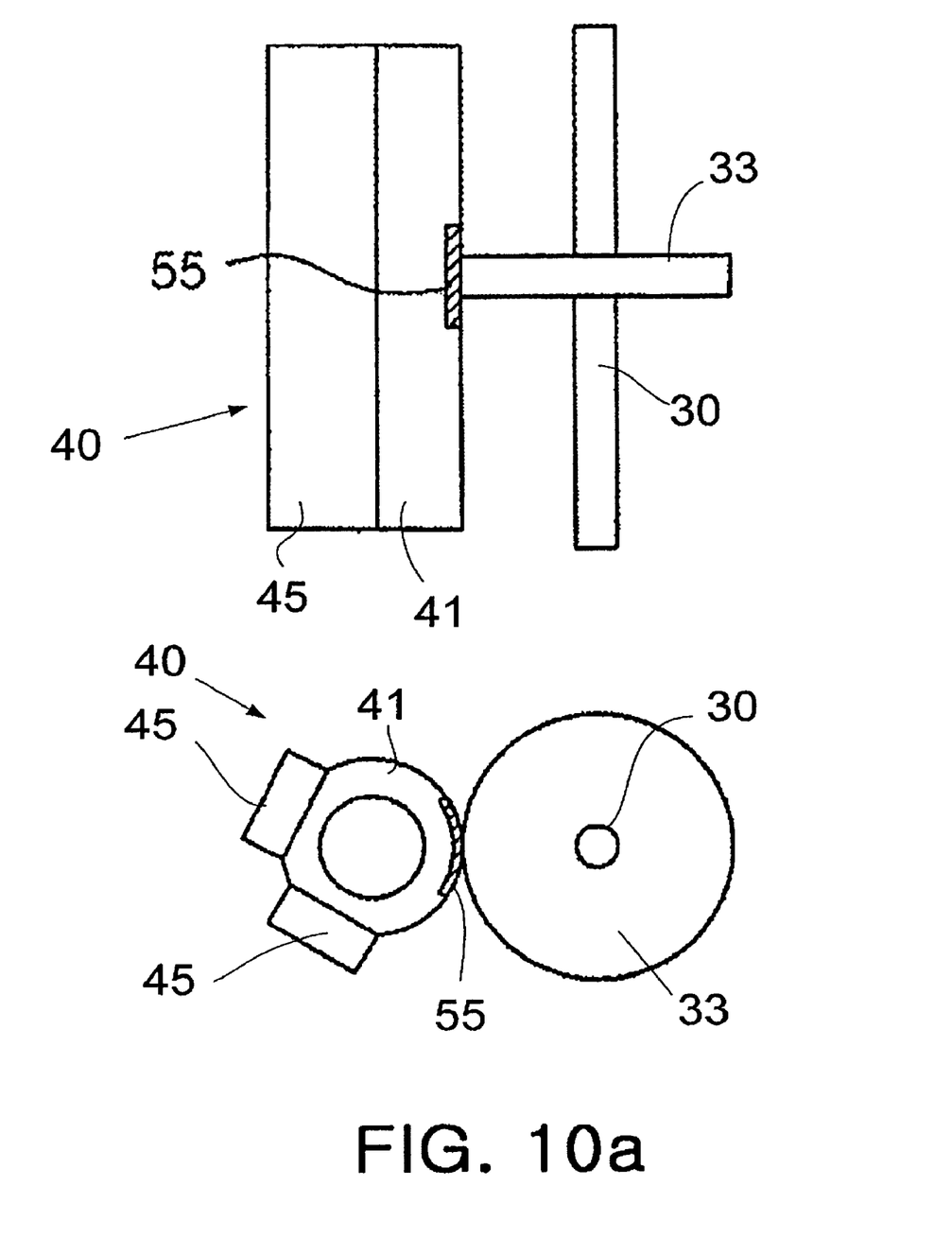
FIGS. 10(a) to 10(c) show arrangements of a frictional material used in the compact lens module according to the present invention.
Figure 10B:
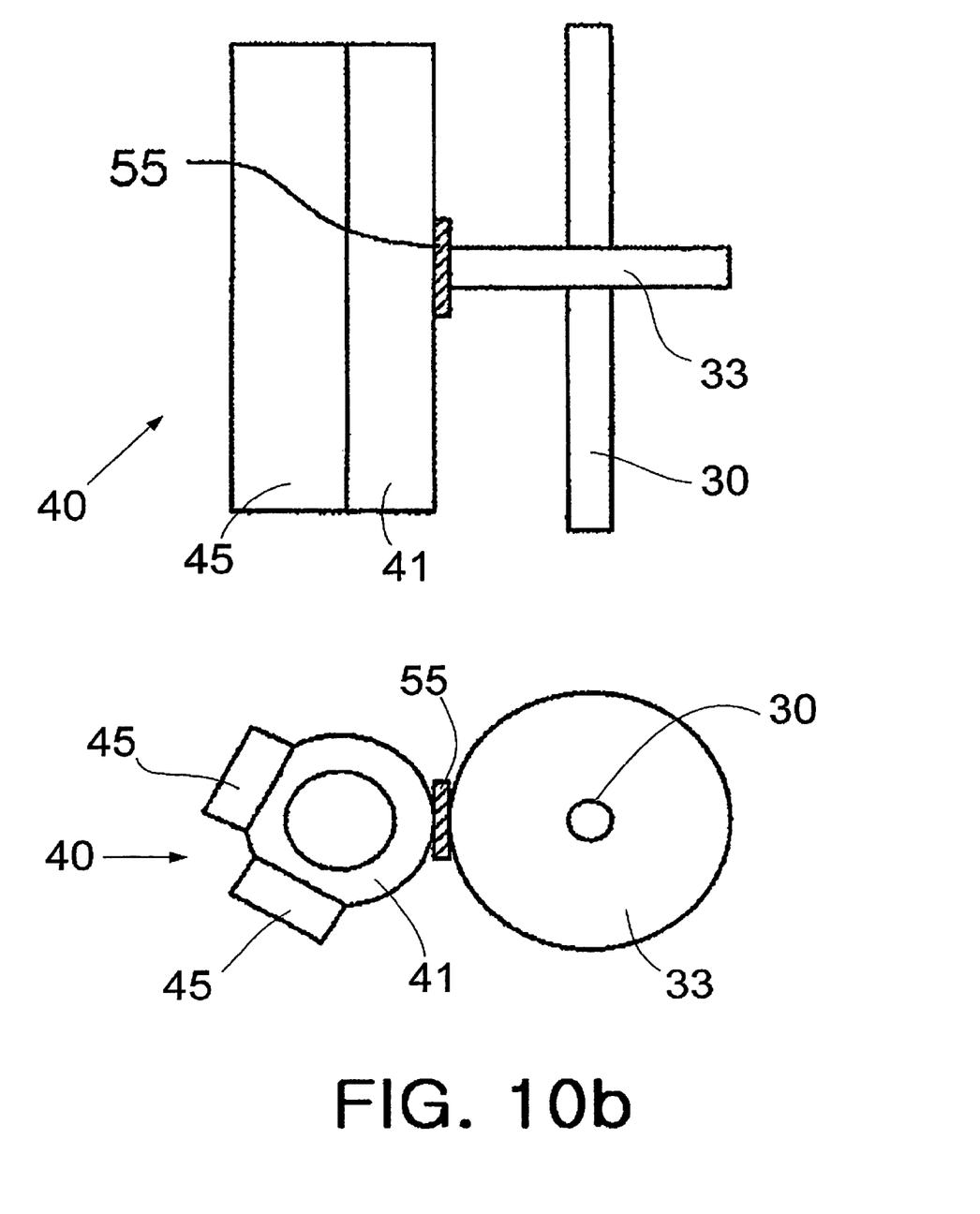
Figure 10C:
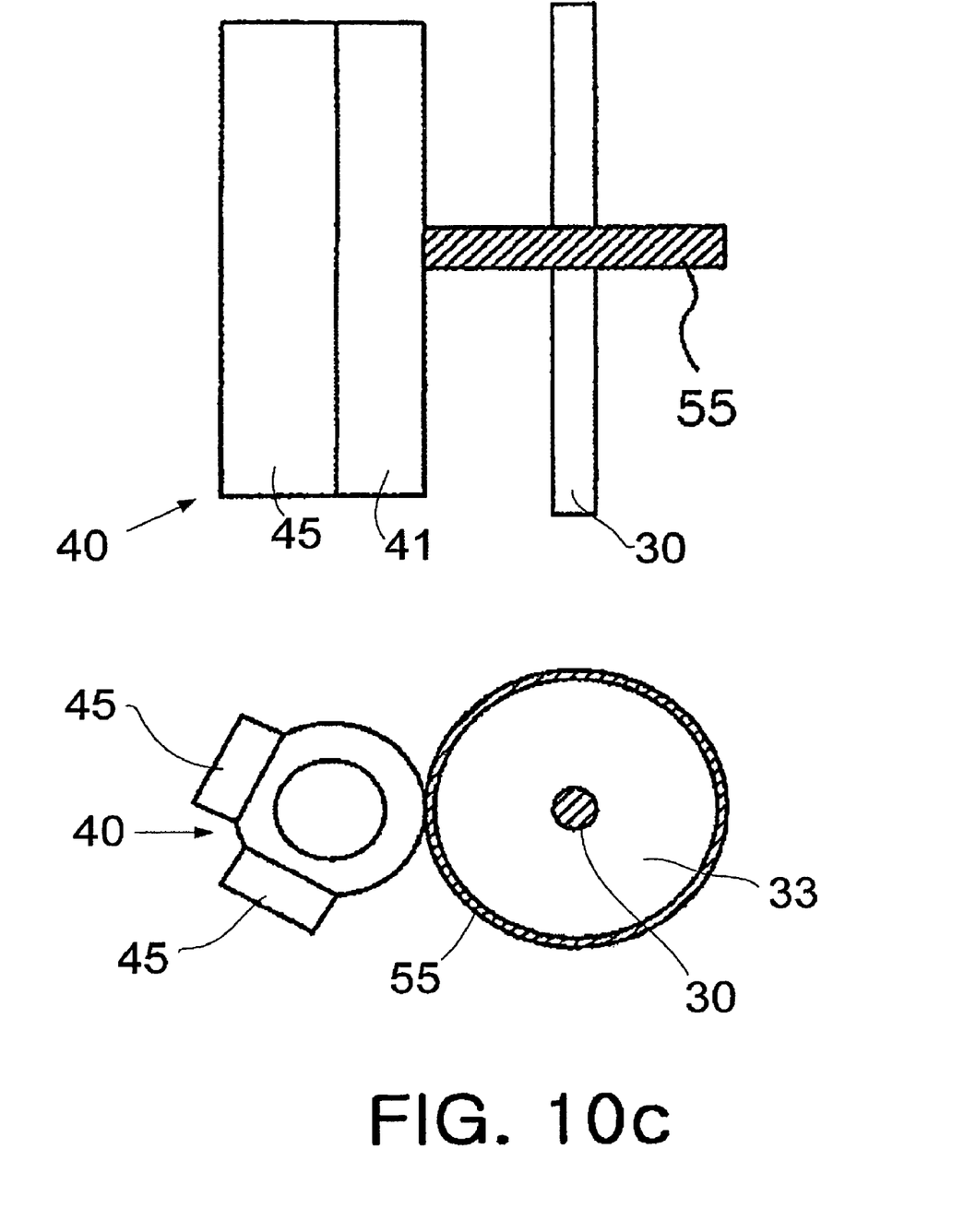

The frictional material 55 may be attached in various ways as shown in FIGS. 10(*a*) to 10(*c*). At first, a frictional film may be attached to the metal tube 41, which is a piezoelectric driving unit, as shown in FIG. 10(*a*), and a frictional plate may also be attached to the metal tube 41 as shown in FIG. 10(*b*). In addition, as shown in FIG. 10(*c*), a frictional film may surround the outer circumference of the contact wheel 33 of the carrying member 30. At this time, in order to attach the frictional plate to the metal tube 41, a polymer or an inorganic ceramic having good hardness and low viscosity may be used.

As described above, the present invention provides a structure that the driving unit rotates the carrying member by repeatedly contacting and non-contacting with the carrying member, and the rotation of the carrying member is transferred to the lens unit such that the lens unit is moved straightly. Accordingly, the lens module may be more simple and small-sized than the convention structure which moves a lens unit by using a lens barrel in which a profile is formed for movement of the lens unit. In addition, the present invention provides the lens module capable of transferring a driving force more accurately with a more direct and simple structure rather than the conventional structure using a DC motor and a reduction gear.

The driving unit of the present invention employs a hollow metal tube piezoelectric driving unit having a structure capable of converting a bending displacement caused by piezoelectric effects into a rotational force. Using such a piezoelectric driving unit enables to give a simple and small-sized lens module rather than the conventional one.

Figure 8:
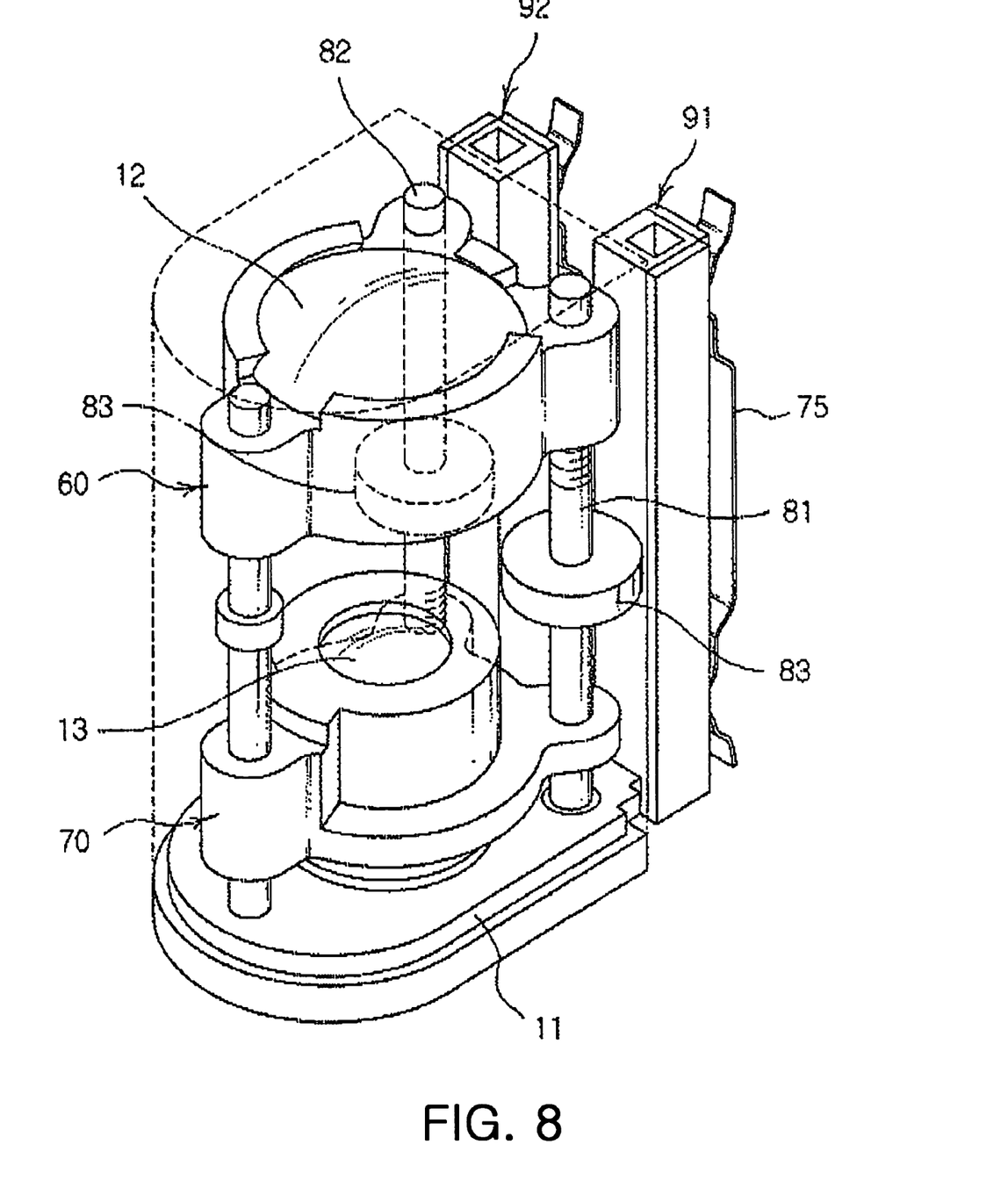
FIG. 8 is a perspective view showing a compact lens module according to another embodiment of the present invention.

FIG. 8 shows a lens module having two lens groups according to the present invention. The lens module of the present invention is configured to be able to perform both zoom function and auto focus function in a compact module. In this reason, the lens module of the present invention provides a lens carrying structure which may be driven by a small-sized driving unit. Now, the lens module which performs the zoom function and the auto focus function at the same time is described.

First, the lens module of FIG. 8 includes a case 11. In the case 11, first and second lens units 60 and 70 having at least one lens 12 and 13 respectively are positioned. At this time, the second lens unit 70 is located at a position spaced apart from the first lens unit 60 in a rear direction. Preferably, the first lens unit 60 has the auto focus function, and the second lens unit 70 has the zoom function.

The first and second lens units 60 and 70 are connected to at least one carrying member 81 and 82. Though FIG. 8 shows two carrying members 82 and 83 corresponding to each lens unit, some lens unit may not be connected to the carrying member so as to perform only the zoom function or only the auto focus function.

Figure 2:
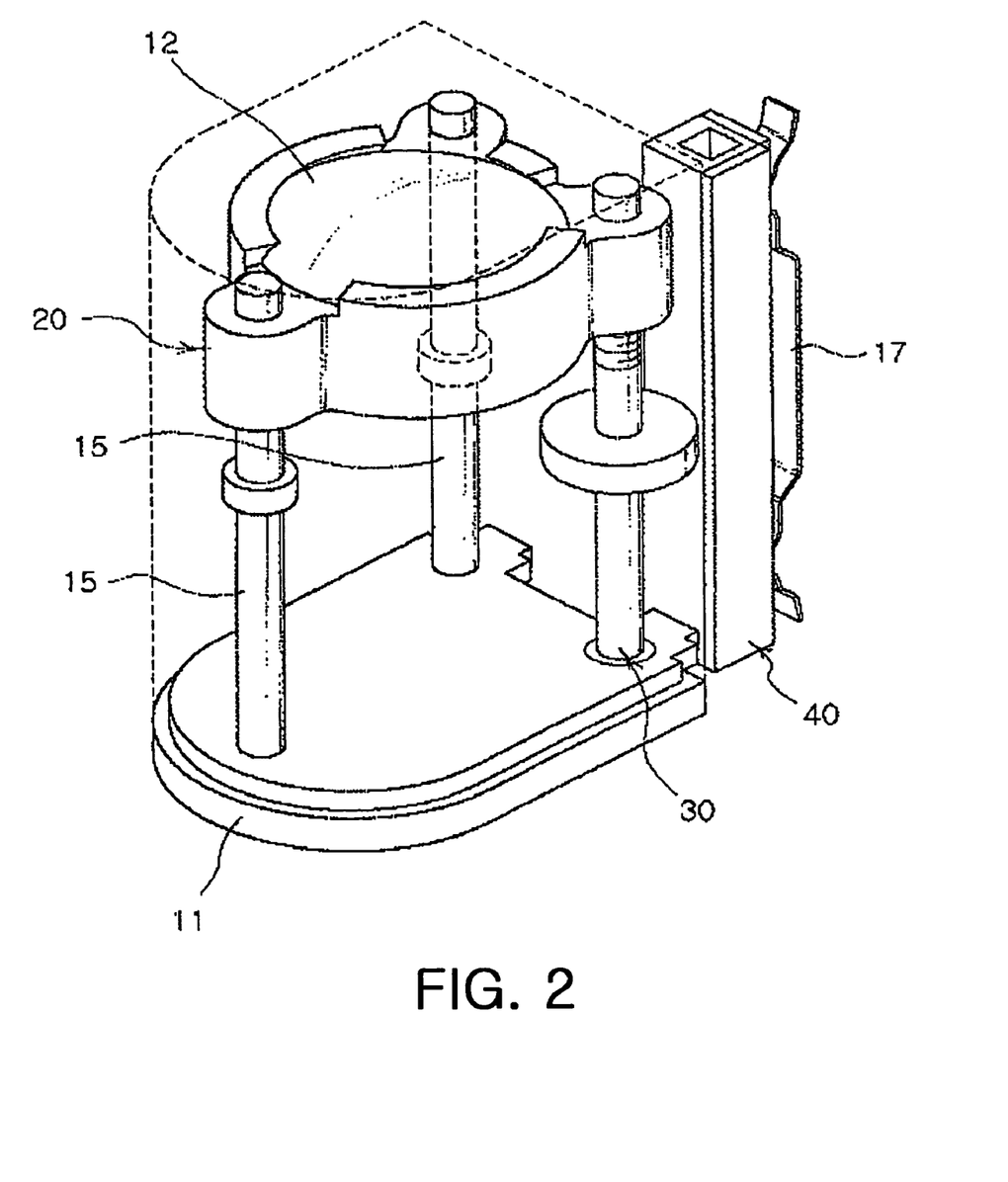
FIG. 2 is a perspective view showing a compact lens module according to an embodiment of the present invention.

As shown in FIG. 8, the carrying member 81 and 82 connected to each lens unit has a shaft shape on which a screw is partially formed, and the screwed portion is connected to the lens unit, similar to the case of FIG. 2. The carrying members 81 and 82 are rotatably connected to inside of the case. The carrying member has a contact wheel of which shape and arrangement are identical to that of FIG. 2.

In addition, driving units 91 and 92 are arranged in correspondence to the carrying members 81 and 82. The driving unit 91 and 92 transfers a driving force for carrying the lens unit by repeating contact and non-contact states with the carrying member. The driving unit is preferably a piezoelectric driving unit including a hollow metal tube and piezoelectric plates attached to at least two sides of the metal tube. The piezoelectric driving unit converts a bending displacement at a center portion of the metal tube in a length direction into a rotational displacement when AC voltages with a phase difference are applied to the piezoelectric plates, like the piezoelectric driving unit of FIG. 2. In addition, the side of the metal tube to which the piezoelectric plate is attached also has a thickness smaller than a side to which a piezoelectric plate is not attached. Moreover, shape and arrangement of the driving unit are identical to those of FIG. 2.

In FIG. 8, each driving unit 91 and 92 and each carrying member are arranged in parallel to each other, and the carrying members 81 and 82 have the screwed portions at opposite parts thereof. It is because the lens units 60 and 70 are arranged up and down. Accordingly the screwed portion plays a role of carrying the lens unit, while an unscrewed portion acts for guiding the other lens unit.

Thus, in FIG. 8, the lens units 60 and 70 have three supports located at 120 degrees on the basis of their center, among which two supports are connected to the carrying members 81 and 82. In the two supports, one is connected to the screwed portion of the carrying member and the other is connected to the shaft of the carrying member. In addition, the remained support besides the two supports is connected to a support member 65 for just guiding the lens unit. The support member 65 is fixed to the case, and the carrying members 81 and 82 are rotatably mounted to the case. For rotation of the carrying member, a bearing may be adopted at a portion of the carrying member which is connected to the case.

The driving unit 91 and 92 is elastically supported by leaf springs fixed in the case at both ends thereof. Such elastic supporting allows the driving unit to have a maximum displacement at a center thereof in a length direction. In addition, the elastic unit continuously applies a force for adhering the driving unit to the carrying member so that the driving force of the driving unit may be efficiently transferred to the carrying member.

The lens module shown in FIG. 8 according to the present invention has two lens groups. Conventionally, three lens groups are commonly used. In the conventional case, a front lens unit approximately conducts a focus control function, a middle lens unit conducts a zoom function, and a rear lens unit conducts an auto focus function with moving separately from the zoom lens. This method however has a limit to reduce its size due to the distance between lenses and the stroke problem. Furthermore, when a lens barrel with a cam curve is used, reducing the size is far more difficult.

The present invention provides a lens module which uses two lens groups for size reduction instead of three lens groups of the prior art, arranges the driving units so that the lens units may move independently, and is capable of controlling movement stroke by adjusting frequency. By using this configuration, the front and rear lens units may conduct the auto focus function and the zoom function respectively, thereby reducing a stroke of the lens, and resultantly reducing the size of the lens driving unit. Accordingly, the lens module may be manufactured in a small size so that it may be inserted into a cellular phone.

According to the present invention, it is possible to make a simpler and smaller lens module than the conventional one which moves a lens unit by a lens barrel on which a lens unit moving profile is formed. In addition, the lens module of the present invention may transfer a driving force in a more direct and simpler way.

Moreover, the lens module of the present invention uses just two lens groups, while the conventional one uses three lens groups, and the lens module of the present invention may exclude a lens barrel and control a stroke by adjusting frequency. This lens module may perform the auto focus function and the zoom function at the same time, reduce a stroke of lens, and have a compact lens driving unit, so it is possible to give a compact lens module which may be inserted into a cellular phone.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A lens module comprising:
   a case;
   a lens unit positioned in the case and having at least one lens;
   a shaft rotatably positioned in the case and connected to the lens unit at a threaded portion of the shaft for moving the lens unit along the shaft;
   a contact wheel formed concentrically at a predetermined position of the shaft and having a diameter greater than the shaft, with a rounded potion of the contact wheel having a continuous even surface; and
   a driving unit mounted in the case for generating supersonic vibration and repeatedly contacting and non-contacting the even rounded surface of the wheel to rotate the shaft whereby the shaft moves the lens unit along the shaft.

2. The lens module according to claim 1, wherein the driving unit is a piezoelectric driving unit.

3. The lens module according to claim 2, wherein the piezoelectric driving unit comprises a hollow metal tube and a piezoelectric plate attached to at least two sides of the metal tube.

4. The lens module according to claim 3, wherein the metal tube is a solid metal rod.

5. The lens module according to claim 3, wherein AC voltages with a phase difference are applied to the piezoelectric plate such that a bending displacement at a central portion of the metal tube in a length direction is converted into a rotational displacement.

6. The lens module according to claim 5, wherein a thickness of the side of the metal tube to which the piezoelectric plate is attached is smaller than a thickness of a side to which a piezoelectric plate is not attached.

7. The lens module according to claim 6, wherein the metal tube has a shape selected from the group consisting of a circular pillar, a rectangular pillar and a triangular pillar.

8. The lens module according to claim 3, wherein the lens unit includes a lens housing for supporting the at least one lens, wherein the threaded portion of the shaft is rotatably inserted to the lens housing so as to convert the driving force transferred from the driving unit into a carrying force in a straight direction and then transfer the carrying force to the lens unit.

9. The lens module according to claim 3, wherein the piezoelectric driving unit is elastically supported by the case at portions adjacent to both ends thereof, and the contact wheel is positioned at a center of the portions where the piezoelectric driving unit is supported.

10. The lens module according to claim 9, wherein the piezoelectric driving unit is elastically supported by a spring.

11. The lens module according to claim 3, wherein the contact wheel and the piezoelectric driving unit are contacted through a frictional material.

12. The lens module according to claim 11, wherein the frictional material is attached along a circumference of the contact wheel.

13. The lens module according to claim 11, wherein the frictional material is attached to the piezoelectric driving unit.

14. A lens module comprising:
    a case;
    a first lens unit positioned in the case and having at least one lens;
    a second lens unit spaced apart from the first lens unit at a rear position thereof and having at least one lens;
    at least one shaft-shaped carrying member rotatably positioned in the case and having a threaded portion, connected to the first or second lens unit so as to move the first or second lens unit forward or backward;
    a contact wheel formed concentrically at a predetermined position of the carrying member and having a diameter greater than that of the carrying member with a rounded portion of the contact wheel having a continuous even surface; and
    at least one driving unit mounted in the case for generating supersonic vibration and repeatedly contacting and non-contacting the even, rounded surface of the wheel to rotate the carrying member, whereby the carrying member moves the lens unit along the carrying member.

15. The lens module according to claim 14, wherein the driving unit is a piezoelectric driving unit including a hollow metal tube and a piezoelectric plate attached to at least two sides of the metal tube.

16. The lens module according to claim 15, wherein the metal tube is a solid metal rod.

17. The lens module according to claim 15, wherein AC voltages with a phase difference are applied to the piezoelectric plate such that a bending displacement of the hollow metal tube at a central portion of the metal tube in a length direction is converted into a rotational displacement of the carrying member.

18. The lens module according to claim 17, wherein a thickness of the side of the metal tube to which the piezoelectric plate is attached is smaller than a thickness of a side to which the piezoelectric plate is not attached.

19. The lens module according to claim 17, wherein the metal tube has a shape selected from the group consisting of a circular pillar, a rectangular pillar and a triangular pillar.

20. The lens module according to claim 15, wherein the lens unit includes a lens housing for supporting the at least one lens, wherein the threaded portion of the carrying member is rotatably inserted to the lens housing so as to convert the rotational driving force transferred from the driving unit into a linear motion of the lens unit.

21. The lens module according to claim 15, wherein the piezoelectric driving unit is elastically supported by the case at portions adjacent to both ends thereof, and the contact wheel is positioned at a center of the portions where the piezoelectric driving unit is supported.

22. The lens module according to claim 21, wherein the piezoelectric driving unit is elastically supported by a leaf spring.

23. The lens module according to claim 15, wherein the contact wheel and the piezoelectric driving unit are contacted through a frictional material.

24. The lens module according to claim 23, wherein the frictional material is attached along a circumference of the contact wheel.

25. The lens module according to claim 23, wherein the frictional material is attached to the piezoelectric driving unit.

26. A lens module comprising:

a first lens unit having at least one lens;

a second lens unit spaced apart from the first lens unit at a rear position thereof and having at least one lens;

first and second carrying members having a shaft shape on which a screw thread is partially formed, each of the first and second carrying members having a circular contact wheel formed coaxially in a radially expanded portion thereof in a direction perpendicular, to an axial direction, with a rounded portion of the contact wheel having a continuous, even surface, the screw threaded portion being respectively connected to the first and second lens units so as to move the first and second lens units forward or backward; and first and second metal tube-shaped piezoelectric driving units each of which being supported at portions adjacent to both ends thereof, the first and second piezoelectric driving units repeatedly contacting and non-contacting the carrying members, respectively whereby the first and second carrying members move the first and second lens units along the length of the carrying members, respectively.

* * * * *